United States Patent
Eaton

[11] Patent Number: 6,149,344
[45] Date of Patent: Nov. 21, 2000

[54] ACID GAS DISPOSAL

[75] Inventor: Frank H. Eaton, Odessa, Tex.

[73] Assignee: Master Corporation, Tex.

[21] Appl. No.: 09/159,986

[22] Filed: Sep. 24, 1998

Related U.S. Application Data

[60] Provisional application No. 60/061,043, Oct. 4, 1997.
[51] Int. Cl.[7] ..................................................... B09B 1/00
[52] U.S. Cl. ......................... 405/128; 166/271; 405/258; 588/250
[58] Field of Search .................................. 405/128, 129, 405/263, 258; 588/249, 250; 95/235, 236; 166/271, 305.1, 272.6, 266, 267

[56] References Cited

U.S. PATENT DOCUMENTS

| | | | |
|---|---|---|---|
| 4,044,831 | 8/1977 | Allen | 166/275 |
| 4,169,133 | 9/1979 | Staege | 423/437 |
| 4,285,917 | 8/1981 | Knight | 423/224 |
| 4,449,994 | 5/1984 | Hegarty et al. | 62/17 |
| 4,576,615 | 3/1986 | Netzer et al. | 55/43 |
| 5,340,382 | 8/1994 | Beard | 95/151 |
| 5,344,627 | 9/1994 | Fujii et al. | 423/220 |
| 5,520,249 | 5/1996 | Minkkinen | 166/266 |

OTHER PUBLICATIONS

H.L. Longworth, SPE, G.C. Dunn, and M. Semchuch; Underground Disposal of Acid Gas in Alberta, Canada: Regulatory Concerns and Case Histories; Apr. 28, 1996.

E. Wichert, Gascan Resources Ltd., and T. Royan, Tartan Engineering Corp. Ltd.; Sulfur Disposal by Acid Gas Injection; Apr. 28, 1996.

*Primary Examiner*—Dennis L. Taylor
*Attorney, Agent, or Firm*—Wendell Coffee

[57] ABSTRACT

Acid gas is liquified by compression and cooling, mixed with water under pressure and flowed into a disposal well.

14 Claims, 1 Drawing Sheet

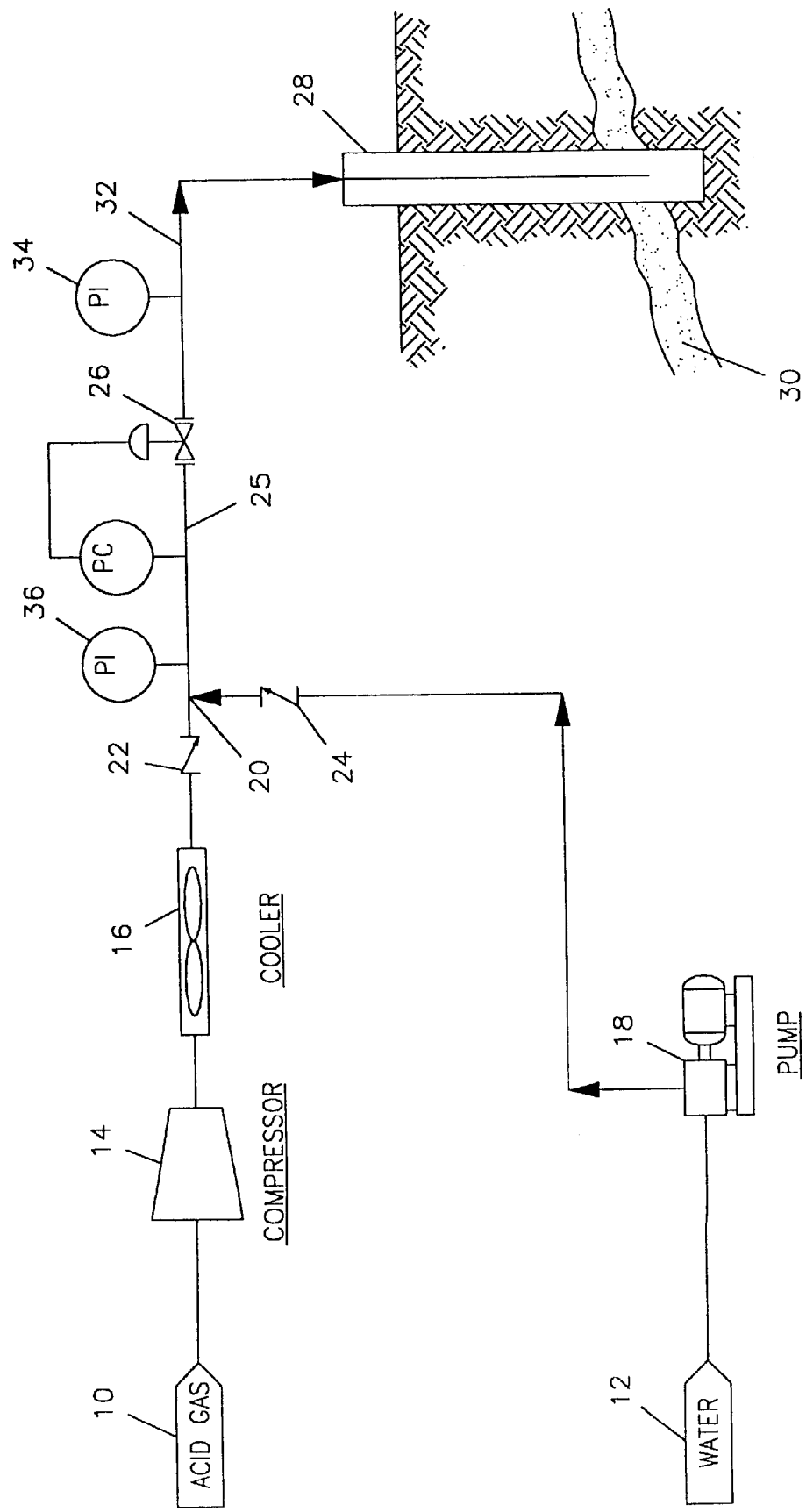

ACID GAS DISPOSAL

PATENT SPECIFICATIONS

Applicant filed a Provisional Application on this subject matter on Oct. 4, 1997, Serial No. 60/061,043. Specific reference is made to that document.

BACKGROUND OF THE INVENTION (1) Field of the Invention

This invention relates to disposal of acid gases. Acid gas as used herein is defined as a gaseous mixture of varying concentrations of carbon dioxide ($CO_2$) and hydrogen sulfide ($H_2S$) resulting from treating processes employed to remove these contaminants from sour hydrocarbon streams such as produced natural gas. These mixtures often are water saturated and contain small amounts of hydrocarbons, treating solvents, absorbants, and other matter.

(2) Description of the Related Art

Before this invention, BEARD in U.S. Pat. No. 5,340,382 disclosed the process of absorbing acid gas at about 400 psi into produced water by a static mixing unit and then pumping the solution into a disposal well. The BEARD process uses about 160 barrels water for about 1,000 cu. ft. of acid gas. If the acid gas were liquified, this would be a ratio (by volume) of approximately 424 $H_2O$:1 dense fluid acid gas.

In Canada (where the acid gases have high hydrogen sulfide content) acid gas is dehydrated, compressed, and injected into disposal wells. Reports of such are found in the Oil & Gas Journal of Apr. 18, 1997 by Edward Wichert and Tom Royan; the 1996 paper given by H. L. Longworth, G. C. Dunn and M. Semchuck at the gas and technology conference held in Calgary, Alberta from the 28th of April until May 1, 1996; the paper of Wichert and Royan given at the same meeting in 1996.

Sulfur recovery plants are another method of dealing with acid gas. This process utilizes catalyst beds to convert over 99% of the $H_2S$ to elemental sulfur. The process off gas is incinerated resulting in release of associated carbon and sulfur dioxides as emissions to the atmosphere.

SUMMARY OF THE INVENTION

This invention disposes of the acid gases by forming the acid gas into a dense aqueous fluid by compression followed by cooling. Then the dense fluid is mixed at high pressure (circa 650 to 2,000 psi) with water.

Occasionally herein the forming of the acid gas into a dense fluid will be referred to as liquefying, and the acid gas as a dense fluid may be referred to as liquified gas or aqueous gas. The term "liquified" or "aqueous" is used in this application to include dense compressed gases which might not technically be a liquid. Also, the alkaline water may be referred to as brackish water or salt water disposal (SWD) water. Although alkaline water is preferred, water with pH below 7.0 may be used as necessary.

A pressure regulated valve controls the pressure of the liquified gas and the water to a suitable pressure until they are mixed. Thereafter the pressure regulated valve releases the mixture into a disposal well.

OBJECTS OF THIS INVENTION

An object of this invention is to dispose of acid gas.

Another object of this invention is to dispose of the acid gas along with the disposing of unwanted alkaline water and other undesirable liquids.

Further objects are to achieve the above with equipment that is sturdy, compact, durable, simple, safe, efficient, versatile, ecologically compatible, energy conserving, and reliable, yet inexpensive and easy to manufacture, install, operate, and maintain.

Other objects are to achieve the above with a method that is rapid, versatile, ecologically compatible, energy conserving, efficient, and inexpensive, and does not require highly skilled people to install, operate, and maintain.

The specific nature of the invention, as well as other objects, uses, and advantages thereof, will clearly appear from the following description and from the accompanying drawings.

BRIEF DESCRIPTION OF THE DRAWINGS

The drawing is a flow diagram of the process involved.

CATALOGUE OF ELEMENTS

As an aid to correlating the terms to the exemplary drawing(s), the following catalog of elements is provided:
10 source of acid gas
12 source of water
14 compressor
16 cooler
18 pump
20 Tee connection
22 check valve
24 check valve
25 confluent line
26 pressure control valve
28 disposal well
30 strata
32 injection tube
34 injection pressure gage
36 confluent pressure gage

DESCRIPTION OF THE PREFERRED EMBODIMENT

According to this invention there will be a source 10 of acid gas resulting from a source such as the treating system for a sour natural gas stream. Usually a source of alkaline water 12 resulting from the production of petroleum products is available. In the event that there is insufficient alkaline water to be disposed of, the source 12 alkaline water might be a well drilled to a strata producing alkaline water. Although fresh water is operable, greater alkalinity, found in brackish water, results in a more neutral solution.

The acid gas from the source 10 is compressed by compressor 14. After the gas is compressed it is cooled by cooler 16. Those skilled in the art will understand that although the compressor 14 and cooler 16 are each shown as single elements, the compression will normally be in stages with cooling after each stage. Also, those skilled in the art are familiar with compressors, coolers, etc. to compress acid gas to pressures necessary for operation, i.e. approximately 650 to 2000 psi.

It is important not to produce bulk aqueous acid gas before the final compression stage. Cooler 16 sufficiently cools the acid gas until it condenses to a dense fluid.

The water is pumped by pump 18 to a high pressure.

The acid gas dense fluid and the high pressure water are combined by Tee connection 20. Although the connection 20 is described as a Tee, it will be understood that the connection of the two flows could be in the form of a Y or a 45° connection. Confluent line 25 receives the mixture from Tee 20. Check valve 22 between the acid gas cooler 16 and the Tee 20 prevents the flow of water from the pump 18 into the cooler 16. Likewise check valve 24 prevents the flow of acid gas dense fluid toward the pump 18. Confluent pressure gage 36 indicates the pressure in the confluent line 25. There is no minimum length for the confluent line 25 except for physical structural limitations.

Pressure valve 26 controls the pressure in confluent line 25 at a suitably high pressure to prevent vaporization of the acid gas dense fluid. Normally according to the design of the particular unit, the pressure control valve will control the pressure at the Tee connection to a range of approximately 650–2000 psi. With a high percentage (e.g. 83%) of $H_2S$ the pressure may be as low as 650 psi and with a high percentage of $CO_2$ (e.g. 75%) the pressure may be as high as 1900 psi. The increase in minimum pressure also will approximate a linear relationship to the percentage of $CO_2$.

The pressure control valve 26 discharges the mixture into an injection tube 32 which extends into the disposal well 28. The injection tube 32 normally has a well head assembly (not shown in drawings) to control the flow. The well head assembly could include both manual and automatic valves. The mixture of acid gas dense fluid and water is injected into the disposal well into a suitable strata 30 deep within the earth.

The size of the compressor will be determined by the amount of acid gas requiring disposal. This amount will generally be known at the time the equipment is assembled. The cooler likewise will be sufficient to cool the compressed gases to a liquid or dense fluid state. The minimum water requirement will depend upon the amount of acid gas to be disposed and also the composition of the acid gas.

Basically hydrogen sulfide is more soluble in water than carbon dioxide. As one example, if the gas for disposal is about 83% hydrogen sulfide and 17% carbon dioxide the disposal process will require approximately two units of water for one unit of aqueous acid gas. The percentages of hydrogen sulfide and carbon dioxide are by mole percent. The unit of water and acid gas dense fluid is by volume.

As another example, if aqueous acid gas has about 50% hydrogen sulfide and about 50% carbon dioxide, a 5:1 ratio of water to dense fluid is satisfactory.

As another example, if the aqueous mixture is about 25% hydrogen sulfide and about 75% carbon dioxide an 8:1 water to dense fluid ratio is required. Basically and approximately the minimum volume of water for one volume of acid gas dense fluid will be a linear relationship.

The minimum water and pressure for the normal range of operation may be estimated as follows:

$R_{H_2O} = 0.25 + 0.10345 \times CO_2\%$ $P_{mix} = 284 + 21.55 \times CO_2\%$

Where $R_{H_2O}$ is the minimum ratio by volume of water having at least a pH of 7.5 to the dense fluid acid gas. (i.e. $R_{H_2O}$:1AG where AG is unit volume of acid gas).

$P_{mix}$ is the minimum pressure in the confluent line in psi.

$CO_2\%$ is the percent of $CO_2$ in a mixture of acid gas on a mole basis.

The above formulas are for temperatures in the range of 60° to 140° F. in the confluent line 25.

The upper temperature limit of acid gas dense fluid at check valve 22 and the mix in the confluent line 25 is approximately 140° F. The preferred temperature of the acid gas at the check valve 22 is below 130° F., and of the mix in the confluent line 25 is below 110° F.

The lower operation limit of temperatures is freezing of the fluid involved.

The above ratios of water to acid gas dense fluid are approximately the minimal amount of water required. If lesser water is used, difficulties may be experienced. If there is an excess of alkaline water to be disposed of in excess of the minimum requirements there is no problem in mixing the additional water into the Tee 20. Those with ordinary skill will know how to proportion the desired volume of water to the volume of acid gas dense fluid. If other compatible and suitable liquids require disposal, they too may be pumped into the confluent line 25.

The pressures are also approximately the minimal pressures to form a dense fluid at temperatures below 120° F. at the check valve 22. The maximum pressures are limited only by the higher cost of higher pressures.

There must be sufficient water to form a stable mixture at the injection pressure. By injection pressure it is meant that pressure at the well head, which is at the top of the disposal well 28. Injection pressure gage 34 in the injection tube 32 down stream from the control valve 26 indicates the injection pressure.

If less than 5% of the mixture of alkaline water and aqueous acid gas vaporizes at this point, normally satisfactory operation will be maintained. If no greater amount of gas than 5% is formed within the flow of the mixture; the gas will normally be in the form of small bubbles. These bubbles will be carried by the flow of fluid into the disposal well 28. As the mixture descends into the disposal well 28 there will be a pressure increase which will force the vapor back into a liquid or dense fluid phase.

If there is insufficient water to form a stable mixture such that more than 5% gas vaporizes; a gas pocket will often form within the injection tube 32 at about the top of the disposal well. This gas pocket will cause an increase in pressure and the operation will become unstable at that time.

The pressure in the injection tube at the pressure gage 34 will be responsive to different events. Obviously the pressure gage 34 will increase with an increased volume of liquids being pumped. For example, if pump 18 were to pump twice as much water, the hydraulic flow in the injection tube would result in a higher pressure at pressure gage 34. Also, as the disposal well is operated, different solids, for example, chemical precipitates or the like will begin to collect in the strata 30 which will reduce its porosity surrounding the disposal well 28. This build-up is to be expected and will result in a slow increase in injection pressure. Such an increase in pressure might normally be no more than 1 psi per day.

Also, under certain condition hydrates will form and adhere to the well surfaces, particularly the inside bore of the injection tube 32. If hydrates form they would be an indication that there was insufficient water being mixed with the aqueous acid gas. This would result in a pressure increase in the range of 5 or 10 pounds per square inch per hour until no flow could be achieved.

The preferred operation includes that manual process calculations or a computer process simulation be conducted with a complete analysis of the acid gas and water to be used. When this simulation is completed, the appropriate process pressures and temperatures can be determined for optimum performance. Such computer simulations can be made with HYSYS software available from Hyprotech, Inc., located in Houston, Tex. for example.

With these different operating criteria the operator can adjust the ratio of water to acid gas dense fluid to obtain stable and satisfactory operating conditions. Normally the unstable conditions will result from an insufficient amount of water for the amount of aqueous acid gas being injected.

From the above it may be seen that it is desirable to always have water flowing into the disposal well even if there is no acid gas being liquified and disposed of at the time.

It is desirable that the confluent line 25 be of a material which resists corrosion from the acid gas and alkaline water mixture. The suitable grades of stainless steel for this purpose are well known in the art and in certain cases it is necessary to solution treat and/or coat the stainless steel before it is put into service. Those skilled in the art will know of the materials of construction for the confluent line.

The embodiment shown and described above is only exemplary. I do not claim to have invented all the parts, elements or steps described. Various modifications can be made in the construction, material, arrangement, and operation, and still be within the scope of my invention.

The restrictive description and drawings of the specific examples above do not point out what an infringement of this patent would be, but are to enable one skilled in the art to make and use the invention. The limits of the invention and the bounds of the patent protection are measured by and defined in the following claims.

I claim as my invention:

1. The method of disposing of acid gas removed from hydrocarbon products comprising the steps of:
    a) compressing the acid gas to a pressure wherein the acid gas will form a dense fluid,
    b) forming a dense fluid by cooling the compressed acid gas,
    c) mixing the acid gas as a dense fluid with sufficient water to form a stable mixture at injection pressure, and
    d) injecting said stable mixture at injection pressure into a disposal well.

2. The method as defined in claim 1 wherein said compression pressure is at least 650 psi.

3. The method as defined in claim 1 wherein said water is alkaline and has a pH of at least 7.5.

4. The method as defined in claim 1 wherein a minimum pressure of step a) is $P_{mix}=284+21.55 \times CO_2\%$ wherein $P_{mix}$ is said minimum pressure in psi and $CO_2\%$ is the percentage of carbon dioxide in the acid gas.

5. The method as defined in claim 4 wherein the compressed acid gas is cooled to a temperature of below 130° F.

6. The method as defined in claim 1 wherein sufficient water is a minimum of $$R_{H_2O}=0.25+0.10345 \times CO_2\%$$

wherein $R_{H_2O}$ is the minimum ratio by volume of water having at least a pH of 7.5 to the dense fluid acid gas.

7. The method as defined in claim 6 wherein the mixed acid gas and water has a temperature of below 110° F.

8. The method as defined in claim 1 further comprising:
    e) mixing the acid gas and water in a confluent line, and
    f) maintaining the pressure in the confluent line to the compression pressure by
    g) limiting the flow from the confluent line by a pressure control valve.

9. The method as defined in claim 8 wherein
    h) determining that the mixture found is stable by less than a significant amount of any component of the acid gas flashing into the gas phase down stream from the control valve.

10. The method as defined in claim 9 wherein determining that the amount of any component of acid gas flashed is more than a significant amount by formation of hydrates adhering on surfaces of the disposal well.

11. The method as defined in claim 9 wherein determining that the amount of any component of acid gas flashed is more than a significant amount by formation of gas pockets down stream of the control valve as determined by rapid increase of pressure down stream of the control valve.

12. The method as defined in claim 9 wherein less than a significant amount of any component of acid gas is flashed is determined when less the 5 percent of said mixture is flashed.

13. The method as defined in claim 9 wherein less than a significant amount of any component of acid gas is flashed is determined by process simulation.

14. The method as defined in claim 9 wherein less than a significant amount of any component of acid gas is flashed is determined by manual process calculations.

* * * * *